(12) United States Patent
Ginthoer

(10) Patent No.: US 11,653,287 B2
(45) Date of Patent: May 16, 2023

(54) APPARATUS AND METHOD FOR A RADIO ACCESS NETWORK

(71) Applicant: Robert Bosch GmbH, Stuttgart (DE)

(72) Inventor: David Osamu Ginthoer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 17/349,019

(22) Filed: Jun. 16, 2021

(65) Prior Publication Data

US 2021/0400561 A1 Dec. 23, 2021

(30) Foreign Application Priority Data

Jun. 19, 2020 (EP) ..................................... 20181183

(51) Int. Cl.
*H04W 40/30* (2009.01)
*H04L 45/302* (2022.01)
*H04W 28/06* (2009.01)
*H04W 40/12* (2009.01)
*H04W 40/20* (2009.01)

(52) U.S. Cl.
CPC ........... *H04W 40/30* (2013.01); *H04L 45/306* (2013.01); *H04W 28/06* (2013.01); *H04W 40/12* (2013.01); *H04W 40/20* (2013.01)

(58) Field of Classification Search
CPC ..... H04W 40/30; H04W 28/06; H04W 40/12; H04W 40/20; H04W 40/16; H04W 28/10; H04L 45/306; H04L 45/24; H04L 45/28; H04L 69/14
See application file for complete search history.

(56) References Cited

U.S. PATENT DOCUMENTS

2019/0319835 A1* 10/2019 Mansfield ............. H04L 41/082
2019/0379597 A1* 12/2019 Kolding ............. H04W 28/065
2020/0112472 A1 4/2020 Fonseca de Oliveira et al.
2021/0329586 A1* 10/2021 Opshaug ............. H04W 64/006

* cited by examiner

*Primary Examiner* — Charles C Jiang
*Assistant Examiner* — Shawn D Miller
(74) *Attorney, Agent, or Firm* — Michael Best & Friedrich LLP

(57) ABSTRACT

A method to operate an apparatus comprises: receiving and/or determining (102) a plurality of condition information characterizing communication paths for communicating with at least one endpoint, wherein the communication paths differ at least in a respective radio channel; receiving and/or determining (104) an application information characterizing at least one communication property of an application; determining (106) a replication decision in dependence on the plurality of condition information and in dependence on the application information; and transmitting (110) a data packet associated with the application on one or a set of the different communication paths in dependence on the replication decision.

12 Claims, 4 Drawing Sheets

APPARATUS AND METHOD FOR A RADIO ACCESS NETWORK

BACKGROUND OF THE INVENTION

The invention is related to an apparatus and a method, in particular for a radio communications network.

The concept of redundant transmission is known, e.g., the Ethernet standard IEEE 802.1CB describes frame replication and elimination over redundant paths in a network to minimize the risk of frame loss in case of a device failure.

SUMMARY OF THE INVENTION

According to an aspect of the description an apparatus is provided, which comprises at least one processor, at least one memory including computer program code, and at least one communication module, the at least one memory and computer program code configured, with the at least one processor, and the at least one communication module, to cause the apparatus at least to: receive a plurality of condition information characterizing communication paths for communicating with at least one endpoint, wherein the communication paths differ at least in a respective radio channel; receive an application information characterizing at least one communication property of an application; determine a replication decision in dependence on the plurality of condition information and in dependence on the application information; and transmit a data packet associated with the application on one or a set of the different communication paths in dependence on the replication decision.

Advantageously, an adaptive multi-connectivity control for serving applications in a radio communications network is provided. Therefore, the multi-connectivity control can decide to omit the duplication, or to put it in other words, the multi-connectivity control will opt for duplication if necessary but will opt-out duplication if not necessary. The number of unnecessary duplicates of the data packet transmitted through the communications network is reduced. In this way, the amount of wasted resources can be reduced, hence improving the system utilization.

Based on the condition information and based on the application information, the replication decision determines for the data packets to be transmitted not only if a duplication over a redundant path is presently required but also takes into consideration if this duplication would be effective.

To improve reliability in the wireless communication network, packet replication as duplication has the advantage that transmission is independent from the other radio communication path. Even if the other frame is completely lost, a successful reception is still possible over the alternative communication path. In other words, path diversity is advantageous to avoid a loss of a data packet. A good example is a moving element that blocks the line of sight such that reception power is severely impacted. In this case, the probability of a reception error is still high. For example, if using multiple access points to transmit data, the shadowing of one link will not influence the other link.

If the communication properties of the application change during operation, e.g. if a control goes into an idle state because it is waiting for new tasks, an adaption of the replication of packets is done. By informing the apparatus with such application information, radio resources/path resources can be reduced as not needed, increasing the available bandwidth for e.g. other coexisting applications.

In particular, industrial applications benefit. By taking into account the application information, the multi-connectivity control is able to adapt the communication network on lower layers granularly to fulfill least one communication requirement of the application.

According to an advantageous example, the apparatus is further configured to: receive context information characterizing an environment of the at least one endpoint; and determine the replication decision in dependence on the plurality of condition information, in dependence on the application information and in dependence on the context information.

For example, if the UE moves into a well-served area, what is indicated by the context information, a single transmission path might be sufficient. So, packet duplication, which achieves robustness and RRC diversity, could be deactivated.

According to an advantageous example, the apparatus is further configured to: receive an area map; receive a spatial position associated with the endpoint; and determine the context information in dependence on the spatial position and in dependence on an area map.

Advantageously, the location of the endpoint or the radio terminal associated with the endpoint is taken into account, when determining the replication decision.

According to an advantageous example, the apparatus is further configured to: receive at least one further spatial position of further entities associated with the environment of the endpoint; and determine the context information in dependence on the spatial position, in dependence on the further spatial position and in dependence on the area map.

For example, a disruption of line-of-sight connections can be detected and replication can be enabled based on this detection.

According to an advantageous example, the application information comprises a survival time that is permitted between the receipts, at an end point, of two subsequent data packets associated with the application.

Advantageously, the replication decision is determined in dependence on the survival time. By considering the survival time, the replication decision is adapted to the requirements of the application on the one hand. On the other hand, resources are used only to an extent necessary for serving the application.

According to an advantageous example, the apparatus is configured to: trigger the determination of the replication decision in dependence on the survival time.

Advantageously, the survival time controls the granularity at which the multi-connectivity control is operated. If the survival time is significantly larger than a flexible threshold, for example a frame inter-arrival time, the multi-connectivity control might not be required to take action at each frame, hence reducing system performance requirements for the multi-connectivity control function.

According to an advantageous example, the apparatus is further configured to: determine or receive an error associated with the transmitted data packet; determine a further replication decision for the transmitted data packet in dependence on the plurality of condition information and in dependence on the application information upon determining or receiving the error associated with the transmitted data packet; and re-transmit the data packet on one or a plurality of the different communication paths in dependence on the further replication decision.

Advantageously, the data packet is re-transmitted according to the present state of the condition information and the application information. For example, application information could include information about frame delivery requirements. Some applications might tolerate some jitter, in which case an immediate retransmission can be used. In this case, the multi-connectivity control is configured such that if a transmission fails, the retransmission will be sent as duplicates over multiple paths, increasing the probability to deliver the retransmission successfully.

According to an advantageous example, determining the replication decision comprises: determine and/or receive, for at least a part of the plurality the communication paths, a probability of a successful communication of the data packet via the respective communication path; select one of the plurality of communication paths which provides the determined probability above a threshold, or select a set of the plurality of communication paths which provide a determined probability below the threshold.

Advantageously, the replication decision is simplified by considering success probabilities for each communication path. The likelihood of successful reception over the better communication path is significantly higher; hence transmitting frames over a communication path with weak signal is a waste of resource. On the other hand, sending data over a weak path requires even more resources since more robust modulation and coding schemes have to be applied to overcome channel errors, requiring more resources. For example, multi connectivity is in most cases beneficial for end points at the cell edge, when signal strength to two access points/serving nodes is similar.

According to a second aspect of the description a method to operate an apparatus is provided, the method comprising: receiving a plurality of condition information characterizing communication paths for communicating with at least one endpoint, wherein the communication paths differ at least in a respective radio channel; receiving an application information characterizing at least one communication property of an application; determining a replication decision in dependence on the plurality of condition information and in dependence on the application information; and transmitting a data packet associated with the application on one or a set of the different communication paths in dependence on the replication decision.

A third aspect of the description is directed to a use of the apparatus according to the first aspect and a use of the method according to the second aspect.

DETAILED DESCRIPTION

Figure 1:
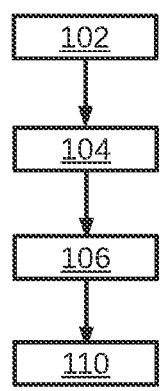
FIG. 1 depicts a schematical flow diagram.

FIG. 1 depicts a schematical flow diagram for operating an apparatus serving a radio communications network or entities thereof. Receiving and/or determining means 102 receive and/or determine a plurality of condition information characterizing communication paths for communicating with at least one endpoint, wherein the communication paths differ at least in a respective radio channel. Receiving and/or determining means 104 receive and/or determine an application information characterizing at least one communication property of an application. Determining means 106 determine a replication decision rp in dependence on the plurality of condition information and in dependence on the application information. Transmitting means 110 transmit a data packet associated with the application on/via one or a set of the different communication paths in dependence on the replication decision rp.

Figure 2:
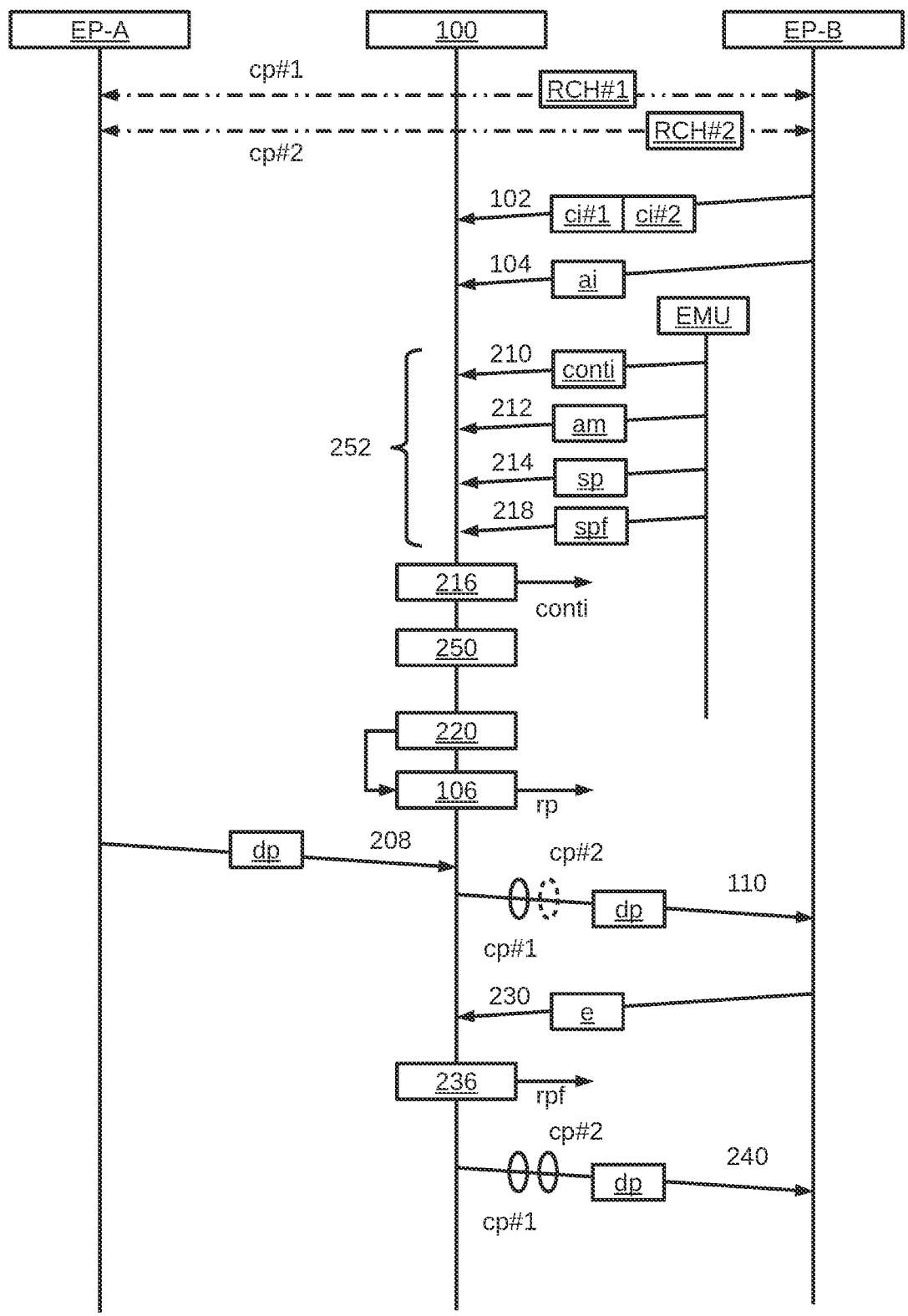
FIG. 2 depicts a schematical sequence diagram.

FIG. 2 depicts a schematical sequence diagram. The receiving means 102 of the apparatus 100 receive a plurality of condition information ci#1, ci#2 characterizing a respective present state of communication paths cp#1, cp#2 for communicating with the at least one endpoint EP-A; EP-B. The communication paths cp#1, cp#2 differ at least in a respective physical radio channel RCH#1, RCH#2, as explained with respect to FIGS. 3 and 4 below.

The receiving means 104 of the apparatus 100 receives the application information ai characterizing at least one communication property of an application, which is executed on the at least one endpoint EP-A, EP-B.

Receiving means 210 receive, for example from the endpoint EP-B or an associated UE or an environment monitoring unit EMU, context information conti characterizing an environment of the at least one endpoint EP-A, EP-B, which is operated at a radio terminal or user equipment UE. Therefore, the endpoint EP-BB communicates via two spatially separated radio channels. The determining means 106 determines the replication decision rp in dependence on the plurality of condition information ci, in dependence on the application information ai and in dependence on the context information conti.

Receiving means 212 receive, for example from the endpoint EP-B or the associated UE or the environment-monitoring unit EMU, an area map am. Receiving means 214 receive, for example from the endpoint EP-B or the associated UE or the environment-monitoring unit EMU, a spatial position sp associated with the endpoint EP-B. Determining means 216 determines the context information conti in dependence on the spatial position sp and in dependence on an area map am.

According to an example, the spatial position comprises an estimate of a future spatial position of the endpoint. This estimate can be determined based on a mobility pattern. For example, the mobility pattern of the endpoint can be taken into consideration to predict that the endpoint will lose its connectivity to the serving TRP or access point soon. In order to minimize the risk of losing packets during handover, replication is enabled as a precaution or even used directly in the handover process MC-assisted soft-handover.

According to another example, the spatial position is the current spatial position of the endpoint. For example, if a wirelessly controlled autonomous vehicle comprising the endpoint is operating at an area where safety is critical e.g. close to humans or other machines, reliability can be increased by setting the respective configuration at the multi-connectivity control. If the vehicle leaves such areas, multi-connectivity control settings can be relaxed to save radio resources.

For example, the context information conti comprises a replication indicator, which indicates that a replication for the application packets due to the environmental context.

Receiving means 218 receives, for example from the endpoint EP-B or the associated UE or the environment monitoring unit, at least one further spatial position spf of further entities associated with the environment of the endpoint EP-B. Determining means 216 determines the context information conti in dependence on the spatial position sp, in dependence on the further spatial position spf and in dependence on the area map am.

Another example for context information could be changing environments, which affects the communication system. For example if heavy machines or goods need to be transported, this usually affects communication systems due to the change in channel characteristics. If the position and movement of such devices are known via context information, the system can enable multi-connectivity/replication for affected endpoints/UEs as a precautionary measure.

According to an example, the application information ai comprises a survival time period that is permitted between the receipt, at an end point EP-A; EP-B, of two subsequent data packets dp associated with the application. For example, The survival time indicates a time period, which the application is able to survive without receiving new data packets. Triggering means 220 triggers the determination of the replication decision rp in dependence on the survival time.

The determining means 106 determines the replication decision rp, which includes a selection of one or more, i.e. a set, of the communication paths cp#1, cp#2, in dependence on the plurality of condition information ci#1, ci#2 and in dependence on the application information ai.

The condition information comprises present states of parameters of the considered communication paths, wherein the present state of parameters also comprises statistical values for the served data stream associated with the endpoint.

Further examples of the condition information include: Statistic values about frame errors for other traffic over the transmission path associated with the served data stream associated with the endpoint; network parameters such as number of UEs connected, interference signals, system utilization, etc.; Signal strength and quality indicators such as Channel quality indicator CQI, Received signal strength indicator RSSI, Signal to noise and interference ratio SINR, etc.; Used transmission parameters such as Modulation Scheme, Coding Rate, etc.

The transmitting means 110 transmits the data packet dp associated with the application on one or a set of the different communication paths cp#1, cp#2 in dependence on the replication decision rp. The data packet dp is received via receiving means 208 by the apparatus 100.

Determining and/or receiving means 230 determines and/ or receives an error associated with the transmitted data packet dp. Determining means 236 determines a further replication decision rp for the transmitted data packet dp in dependence on the plurality of condition information ci#1, ci#2 and in dependence on the application information ai upon determining or receiving the error e associated with the transmitted data packet d. According to an example, the survival time is also part of the determination of the replication decision. Retransmission means 240 re-transmits the data packet dp on one or a plurality of the different communication paths cp#1, cp#2 in dependence on the further replication decision rpf.

The further replication decision indicates how the data packet dp is repeated via the plurality of different communication paths, for example prior to a lapse of the survival time after the determination of the error or prior to a lapse of the survival time after a transmission of the previously transmitted data packet associated with the error.

According to an example, the apparatus 100 can omit replicating the data packet on a plurality of communication paths as the survival time indicates that the application tolerates frame losses to a certain extent.

For example, industrial applications can have various communication properties from an application point of view. For example, control applications require cyclic frame delivery and come with the survival time. Within the survival time, frame losses can be tolerated, however if for longer periods frames are not received, the application will fail. Often this results in cases where a frame loss is tolerated, but consecutive losses will halt the system. In these cases the application information comprises the survival time, that is to configure the multi-connectivity control in a way that precaution measures in form of the determined replication decision are taken if a frame error/the error associated with the at least one transmitted data happens. The multi-connectivity control then makes the decision to duplicate the next data packet over multiple possible transmission paths in order to reduce the likelihood of losing the subsequent frame.

The determination of the replication decision rp, rpf comprises determining the means and/or receiving means 102 to determine and/or receive, for at least a part of the plurality the communication paths cp#1, cp#2, a probability of a successful communication of the data packet dp via the respective communication path cp#1, cp#2 According to an example, the respective probabilities are determined in dependence on the corresponding condition information. According to another example, the condition information comprises the probabilities. The apparatus 100 selects one of the plurality of communication paths cp#1, cp#2 which provides the determined probability above a threshold, or selects a set of the plurality of communication paths cp#1, cp#2 which provide a determined probability below the threshold.

The condition information ci#1, ci#2 can be used to predict the successfulness of data packet transmission. If, for example, the communication system is under high load with many connected users at an access point, the probability of experiencing strong interference is higher than under low load, which can result in frame errors. In this case, the multi-connectivity control can decide to transmit the data packet over two independent paths or even over the other path in case the success probability seems too low over a single path. Especially monitoring other ongoing streams in the system can be leveraged to detect for example a line-of-sight blockage in environment by monitoring the condition information of other streams. In that case, it would be also beneficial to transmit a duplicate as a fall back over an alternative communication path.

A long survival time allows to act rather "reactive", i.e. counter-measures like the replication decision rp are taken when a packet failure has occurred and detected. With a short survival time, resilience is increased prematurely ("proactively"), e.g. if the probability of success of a transmission over a single channel seems low (before it has even occurred).

Low-level parameters such as channel quality measurements are useful to compare different communication paths over different radio channels. If the signal quality or signal strength on one radio channel is way higher than on the other one, the data packet is transmitted over the path with the good signal. Therefore, signal quality could be used as the probability of an error-free communication.

However, even in cases where channel quality is similar over two different links, but the quality is very high, it might be sufficient to only transmit over a single link/single communication path. E.g., if only few users are connected to the same access point/node, only little interference is experienced, and/or signal reception is strong, the probability of an error-free transmission over a single link can be sufficient for the application. In this case, duplication is disabled.

The apparatus 100 transmits a service condition message towards the endpoints EP-A, EP-B if the determined probabilities for the plurality of communication paths are below a further threshold. The service condition message indicates that the application requirement indicated via the application information cannot be met.

The multi-connectivity control via the apparatus 100 comprises a logic to control the number of redundant copies of data packets. Since the multi-connectivity control has knowledge of the status of transmission over all redundant communication paths, according to an example, the apparatus 100 additionally controls transmission configuration over each link. If e.g. multi-connectivity control decides to use a single communication path without a redundant communication path, it is beneficial to make the communication path more robust against frame errors. In this case, the multi-connectivity control configures transmission parameters such as modulation and coding schemes MCS of a radio channel being part of the communication path. Therefore, the apparatus 100 comprises determining and transmitting means, which are configured to determine and transmit information characterizing a configuration of a radio channel towards an UE associated with one of the endpoints EP-A, EP-B in dependence on the application information and in dependence on the plurality of condition information. The information characterizing the configuration is sent towards the respective gNB which is part of the communication path selected for a transmission of the data packet dp in order to increase or decrease reliability. For example, the information characterizing the configuration comprises the modulation and coding scheme, a transmission power, a reception power, etc.

After fetching information including the application information ai, the multi-connectivity control is configured via configuration means 250, e.g. threshold values for condition information above which multi-connectivity is enabled, decision granularity e.g. decide after each frame, maximum number of secondary gNB links SgNB, etc. After the multi-connectivity control is configured and operational, condition information ci#1, ci#2 of respective communication paths are continuously monitored via monitoring means 252, as well as context information conti. Using that input, the multi-connectivity control makes the replication decision rp based on the configuration determined via configuration means 250. Frames/Data packets can then be either transmitted over the main link served by a master gNB MgNB, or over the master gNB and one or multiple secondary links of a secondary gNB SgNB. After that the process of monitoring via monitoring means 252 and triggering the replication decision via triggering means 220 and determining means 106 repeats for every subsequent frame or data packet in the system.

Figure 3:
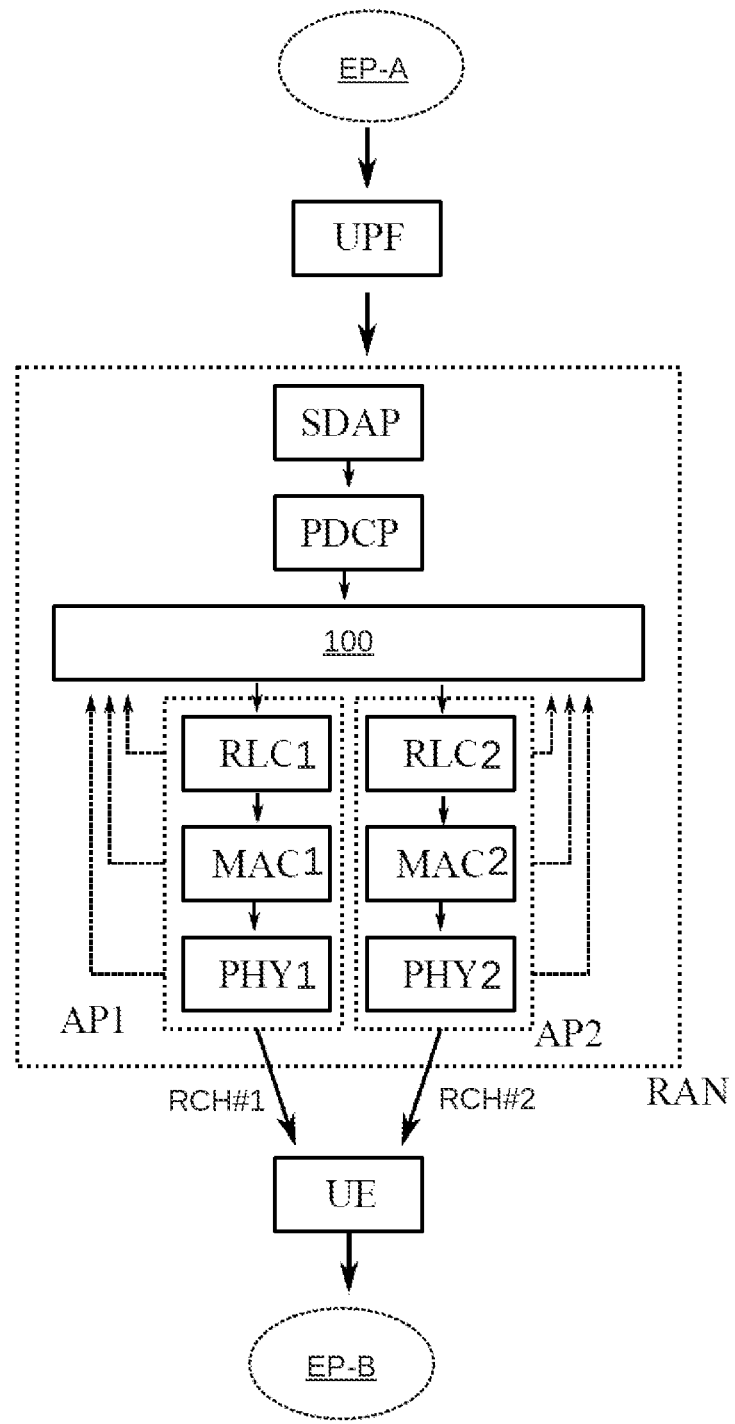
FIGS. 3 and 4 each depict a schematical block diagram.

FIG. 3 depicts a dual connectivity case, where PDCP duplication is applied. The apparatus 100 is arranged between a PDCP function and the RLC functions RLC1, RLC2 of different access points AP1, AP2, which are transmission reception points, for example. The communication paths cp#1, cp#2 between the endpoints EP-A and EP-B differ in the radio channels RCH#1 and RCH#2. The user equipment UE receives both radio channels RCH#1 and RCH#2 in a downlink direction and provides the received data packets to the endpoint EP-B.

For example, the radio channels RCH#1 and RCH#2 are associated with a radio bearer. Radio bearers are channels offered by a layer 2 function to higher layers for the transfer of either user and/or control data. For example, the application detection is done using a Service Data Flow SDF traffic filter, 3-tuple protocol, server-side IP address and port number Packet Flow Description PFD received from the SMF, or the like.

The PHY layer PHY: physical interface transmits information from the MAC transport channels over the air interface and handles functions such as power control, link adaption and cell search.

The MAC layer MAC: Medium Access Control provides mapping between logical channels and transport channels, and handles multiplexing/demultiplexing of RLC PDUs, scheduling information reporting, error correction, priority handling between UEs, and transport format selection.

The RLC layer RLC: Radio Link Control provides transfer of upper layer PDUs according to transmission modes, error correction, sequence numbering, segmentation and re-segmentation.

The PDCP layer PDCP: Packet Data Convergence Protocol provides handling of transfer of user data, header compression, sequence numbering, duplication detection, packet duplication.

The SDAP layer SDAP: Service Data Adaptation Protocol handles mapping between a QoS flow QoS: Quality of Service and a data radio bearer.

Figure 4:
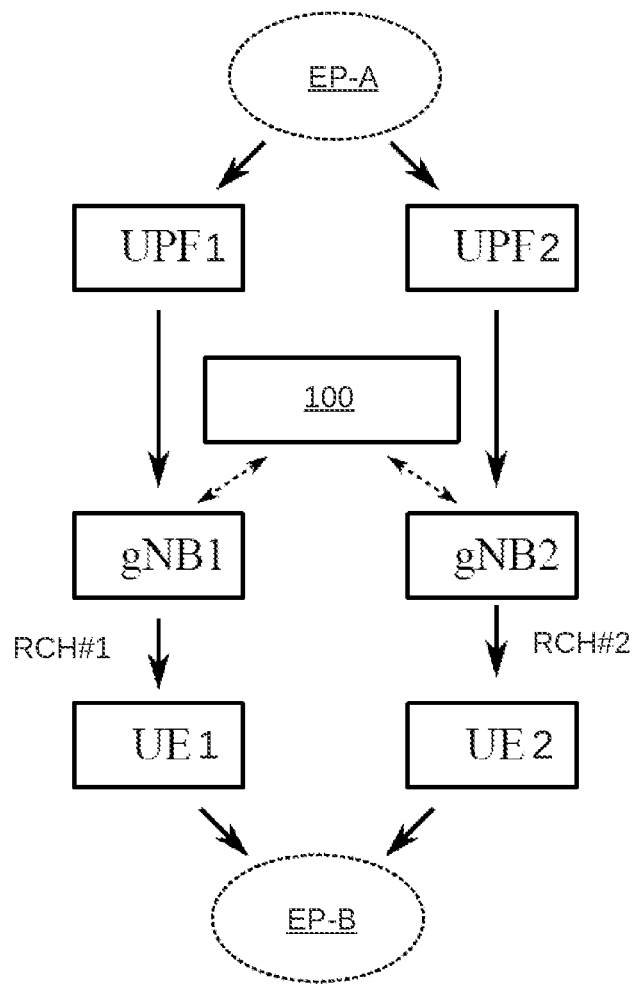

FIG. 4 depicts the full redundancy case between both endpoints EP-A and EP-B with duplicated UEs. The apparatus 100 is arranged between two gNBs gNB1 and gNB2 gNB: next generation eNodeB. The communication paths between the endpoints EP-A and EP-B differ in the radio channels RCH#1 and RCH#2 and in the paths between the user plane functions UPF1 and UPF2. The user equipment UE1 and UE2 receive the respective radio channel RCH#1 or RCH#2 in a downlink direction and provide the received data packets to the endpoint EP-B.

The invention claimed is:

1. An apparatus comprising at least one processor, at least one memory including computer program code, and at least one communication module, the at least one memory and computer program code configured, with the at least one processor, and the at least one communication module, to cause the apparatus at least to:
   receive and/or determine a plurality of condition information characterizing communication paths for communicating with at least one endpoint, wherein
      the condition information includes at least one selected from the group consisting of statistic values about frame errors for traffic over the communication paths, network parameters, interference signals, and system utilization, and
      the communication paths differ at least in a respective radio channel;
   receive and/or determine an application information characterizing at least one communication property of an application, the application information at least including a survival time that is permitted between the receipt, at an end point, of two subsequent data packets associated with the application;
   receive context information characterizing an environment of the at least one endpoint;
   determine a replication decision in dependence on the plurality of condition information, and in dependence on the application information, and in dependence on the context information; and
   transmit a data packet associated with the application on one or a set of the different communication paths in dependence on the replication decision.

2. The apparatus according to claim 1, wherein the apparatus is further configured to:
   receive an area map;
   receive a spatial position associated with the endpoint; and determine the context information in dependence on the spatial position and in dependence on an area map.

3. The apparatus according to claim 2, wherein the apparatus is further configured to:
receive at least one further spatial position of further entities associated with the environment of the endpoint; and
determine the context information in dependence on the spatial position, in dependence on the further spatial position and in dependence on the area map.

4. The apparatus according to claim 1, wherein the apparatus is further configured to:
determine or receive an error associated with the transmitted data packet;
determine a further replication decision for the transmitted data packet in dependence on the plurality of condition information and in dependence on the application information upon determining or receiving the error associated with the transmitted data packet; and
re-transmit the data packet on one or a plurality of the different communication paths in dependence on the further replication decision.

5. The apparatus according to claim 1, wherein determining the replication decision comprises:
determine and/or receive for at least a part of the plurality the communication paths, a probability of a successful communication of the data packet via the respective communication path; and
select one of the plurality of communication paths which provides the probability above a threshold, or
select a set of the plurality of communication paths which provide the probability below the threshold.

6. The apparatus according to claim 1, wherein the apparatus is further configured to
determine information characterizing a configuration of a radio channel associated with one of the endpoints in dependence on the application information and in dependence on the plurality of condition information; and
transmit the information characterizing the configuration of the radio channel.

7. A method to operate an apparatus, the method comprising:
receiving and/or determining a plurality of condition information characterizing communication paths for communicating with at least one endpoint, wherein
the condition information includes at least one selected from the group consisting of statistic values about frame errors for traffic over the communication paths, network parameters, interference signals, and system utilization, and
the communication paths differ at least in a respective radio channel;
receiving and/or determining an application information characterizing at least one communication property of an application, the application information at least including a survival time that is permitted between the receipt, at an end point, of two subsequent data packets associated with the application;
receiving context information characterizing an environment of the at least one endpoint;
determining a replication decision in dependence on the plurality of condition information and in dependence on the application information; and
transmitting a data packet associated with the application on one or a set of the different communication paths in dependence on the replication decision.

8. The method according to claim 7 comprising
receiving an area map;
receiving a spatial position associated with the endpoint; and
determining the context information in dependence on the spatial position and in dependence on an area map.

9. The method according to claim 8 comprising
receiving at least one further spatial position of further entities associated with the environment of the endpoint; and
determining the context information in dependence on the spatial position, in dependence on the further spatial position and in dependence on the area map.

10. The method according to claim 7 further comprising
determining or receiving an error associated with the transmitted data packet;
determining a further replication decision for the transmitted data packet-(dp) in dependence on the plurality of condition information and in dependence on the application information upon determining or receiving the error associated with the transmitted data packet; and
re-transmitting the data packet on one or a plurality of the different communication paths in dependence on the further replication decision.

11. The method according to claim 7, wherein determining the replication decision comprises:
determining and/or receiving), for at least a part of the plurality the communication paths, a probability of a successful communication of the data packet via the respective communication path; and
selecting one of the plurality of communication paths which provides the probability above a threshold, or
selecting a set of the plurality of communication paths which provide the probability below the threshold.

12. The method according to claim 7, the method comprising
determining information characterizing a configuration of a radio channel associated with one of the endpoints in dependence on the application information and in dependence on the plurality of condition information; and
transmitting the information characterizing the configuration of the radio channel.

\* \* \* \* \*